(12) United States Patent
Baldwin et al.

(10) Patent No.: US 6,968,355 B2
(45) Date of Patent: Nov. 22, 2005

(54) METHOD AND SYSTEM FOR PROVIDING DISTRIBUTED FUNCTIONALTIY AND DATA ANALYSIS SYSTEM UTILIZING SAME

(75) Inventors: Bernard Baldwin, Stamford, CT (US); Juan Conde, Stamford, CT (US)

(73) Assignee: UBS AG, Zurich (CH)

( * ) Notice: Subject to any disclaimer, the term of this patent is extended or adjusted under 35 U.S.C. 154(b) by 780 days.

(21) Appl. No.: 09/893,202

(22) Filed: Jun. 27, 2001

(65) Prior Publication Data

US 2002/0112056 A1 Aug. 15, 2002

Related U.S. Application Data

(60) Provisional application No. 60/214,756, filed on Jun. 27, 2000.

(51) Int. Cl.[7] .............................................. G06F 15/16
(52) U.S. Cl. .................................. 709/201; 707/103 R
(58) Field of Search ................................. 709/201, 217, 709/225; 719/315, 330; 707/103

(56) References Cited

U.S. PATENT DOCUMENTS

| | | | | |
|---|---|---|---|---|
| 5,255,358 A | * | 10/1993 | Busboom et al. | 715/843 |
| 5,371,848 A | * | 12/1994 | Casey et al. | 715/823 |
| 5,446,896 A | * | 8/1995 | Hegarty et al. | 707/1 |
| 5,471,596 A | | 11/1995 | Brown, III | 395/375 |
| 5,692,157 A | * | 11/1997 | Williams | 709/246 |
| 5,859,972 A | * | 1/1999 | Subramaniam et al. | 709/203 |
| 5,881,380 A | | 3/1999 | Mochizuki et al. | 707/102 |
| 5,913,064 A | * | 6/1999 | Chen | 717/108 |
| 6,067,548 A | * | 5/2000 | Cheng | 707/103 R |
| 6,288,726 B1 | * | 9/2001 | Ballard | 345/468 |
| 6,345,292 B1 | * | 2/2002 | Daugherty et al. | 709/214 |
| 6,499,036 B1 | * | 12/2002 | Gurevich | 707/103 R |
| 6,526,129 B1 | * | 2/2003 | Beaton et al. | 379/90.01 |
| 6,556,963 B1 | * | 4/2003 | Tetzlaff | 704/9 |
| 6,769,019 B2 | * | 7/2004 | Ferguson | 709/219 |

OTHER PUBLICATIONS

Carr et al., "Compiling Distr8buted C++", IEEE, 1993, pp. 496–503.*
International Search Report dated Oct. 5, 2001 for PCT/US01/20526.

* cited by examiner

Primary Examiner—Bunjob Jaroenchonwanit
(74) Attorney, Agent, or Firm—Proskauer Rose LLP

(57) ABSTRACT

Methods and systems for providing distributed functionality to a plurality of clients comprise the use of more provider servers which publish function objects to clients upon request. Each function object corresponds to a function that is supported by the provider server or a connected downstream provider server. Group definition can also be published by the provider server. The client software is dynamically responsive to the functions which are available from the provider servers and permit a user of the client to select specific functions from the set of available functions for execution. Functions can be executed by modifying the function object to include specific parameter values and sending it to a provider server. Results of function evaluation can be returned in a further modified function object. In a particular implementation, the functions return financial information about specified financial securities and the client graphically displays the returned data.

22 Claims, 10 Drawing Sheets

104
106
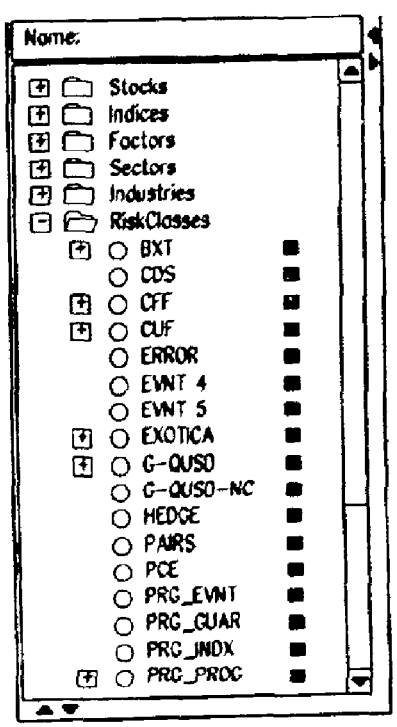
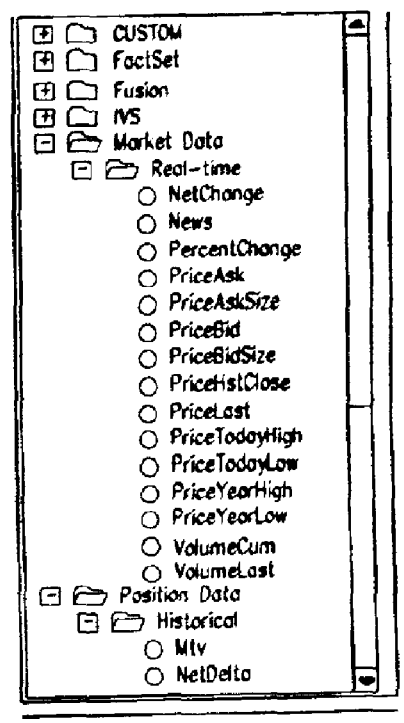
Group Selection Tree
FIG. 9(A)
Function Selection Tree
FIG. 9(B)

METHOD AND SYSTEM FOR PROVIDING DISTRIBUTED FUNCTIONALTIY AND DATA ANALYSIS SYSTEM UTILIZING SAME

CROSS-REFERENCE(S) TO RELATED APPLICATIONS

The present application claims priority from U.S. Provisional Application Ser. No. 60/214,756 filed on Jun. 27, 2000, the entire contents of which is hereby incorporated by reference.

FIELD OF THE INVENTION

The present invention relates to a system and method for distributing analytical data across relational databases and special-purpose network servers. More specifically, the present invention provides for the distribution of analytical data through the use of groups of data objects and functions that operate on the groups of data objects.

BACKGROUND

There are many situations where a server system is configured to be accessed by multiple clients and where at least some of the functionality required by software at the client computer is provided by a remotely located machine, such as the server or another machine connected to the client. There are various different techniques to provide distributed functionality.

Conventional distributed computing technologies allow computer programs running in different address spaces and on different machines to communicate. These technologies are based on low-level network protocols such as TCP/IP. Currently, conventional distributed computing systems utilize two distinct technologies: remote procedure call methods, such as Sun Microsystem's RPC and RMI, and distributed object systems such as the Object Management Group's CORBA and Microsoft's DCOM.

Remote Procedure Calls allow a client computer to call a function which is executed on a server. A Remote Procedure Call (RPC) abstracts the communication interface to the level of a procedure call and gives a programmer of the client software to treat the function as a local procedure when in fact the arguments of the call are transmitted to the remote target of the call and the results are returned. RPC systems encode arguments and return values using an external data representation, such as XDR. Other common distributed object systems include CORBA (the Common Object Request Broker Architecture) and Microsoft's DCOM (Distributed Component Object Model). The conceptual underpinning of both of these systems is the notion of "distributed objects" which are viewed as an extension of the object-oriented paradigm across networks, A significant drawback to both remote procedure and distributed object systems is that the client programs must have prior knowledge of the functions provided by the server and be specifically programmed to make use of these functions. As a result, when new functions are introduced, the client software must be upgraded to make use of new features provided by the server. Similarly, the client software must be specifically updated when a function is removed from the server. Moreover, if a function on a server becomes temporarily unavailable, e.g., as the result of a hardware failure, clients continuing to call the function will receive errors or other unexpected replies from the server.

Accordingly there is a need to provide an improved system and method for supplying distributed functionality across a network of servers and clients. There is a further need to provide a system which allows the clients to manipulate and display data without prior knowledge of the data types and services provided by the servers and to permit the clients to dynamically adapt to changes in available functionality.

SUMMARY OF THE INVENTION

The present invention provides a system and method for extending the capabilities of publish/subscribe and remote procedure systems by providing a mechanism for network servers to publish data types and functions to clients which can then use, build on, and evaluate expressions using these functions.

The system according to the present invention comprises one or more "provider" servers which can be accessed by clients via a network. Each provider server can publish a list of supported functions to the client and provide a facility where the functions can be evaluated.

The architecture of the present invention centers around an at least substantially standardized "provider" interface which supports a service called "provide" that returns a list of functions the provider server supports and a service called "evaluate" which takes as an argument one or more of the functions with a specific set of parameters and returns corresponding objects which contain the result of the evaluation. The providers can be hierarchically connected such that a top-level provider will return function objects that itself supports as well as objects supported by lower-level providers connected to it. Requests to evaluate a function are processed at the provider or passed to a lower-level in the hierarchy as appropriate.

When a client initially connects to a provider server, a provide request is issued and the provider sends the client a set of function data objects which represent the available functions at the provider and specify the parameters and other data related to the function. The client can execute a function by forwarding a function object to the function provider using an appropriate "evaluate" command which contains as an argument a copy of the respective function object that has been modified to specify the particular parameter data of interest. The evaluated function data is placed in the function object which is then returned to the client.

Servers can be arranged hierarchically and provide functions themselves as well as act as a function gateway between a client and a downstream function provider. To build up a network of servers, "manager" functionality can be provided to gather the provider servers together and act as a conduit between the various providers and the clients. A dedicated manager server can be provided to co-ordinate and prioritize activities between the various servers and the client or the manager functionality can be implemented within a provider which supports functions of its own as well as connecting to downstream providers. Preferably a single server "gateway" is provided between the client and one or more function providers such that the client need only communicate with a single server while the gateway is responsible for coordinating access to the various provider servers.

In addition to the provide/evaluate services, a server can also implement a group/Provider interface to publish new data types, data objects, and groups of objects on which the defined functions can operate. In a particular embodiment, this interface comprises a "getAtoms" service which returns a list of objects, or "atoms" of each data type, where each list can be identified by a text string that is unique for its type.

For those cases where it is impractical to return the full list of atoms, this service can return an indication that the atom universe is "open", i.e., atoms identified by any string are valid. A "getGroups" service can be provided which returns data specifying defined logical groupings of the atoms. The group data is preferably returned in a tree-like data structure. In addition, a "getTypes" service can be provided to return a list of types of objects, each identified by a text string.

In a specific embodiment, the distributed function architecture is used to provide a client-based financial data management tool which can be used to graph or otherwise analyze data related to specified securities, classes, industries, or the like. Various types of data analysis functions are supplied by the function provider network. When the client is initialized, the various function objects and groups are retrieved. A user of the client system, after selecting a general type of analysis desired, such as a scatter plot, can select available data functions to plot, where the functions available include functions that are supported by the providers. The functions can be selected from a list, such as a pull-down menu, or other mechanism. Because the list of functionality is dependent upon the function objects supplied by the providers, the client is dynamically responsive to changes in the various available functions supported by the provider and can give users access to new functions without requiring reprogramming or reconfiguring.

Provider servers can be implemented to provide functions and groups related to specific types of data. For example, a server according to the present invention that can provide real-time market data for stock symbols on demand can provide a getTypes service which returns the text string "StockSymbols", a getAtoms service which returns the stock symbol universe tagged as atoms of type StockSymbols" and a getGroups service which can return groupings of the stocks into indexes, sectors. Alternatively, indexes and sectors can be provided by a separate server. The market data server getFunctions service returns functions such as "bid", "ask", and "last", each of which takes an atom of type "StockSymbol" as a parameter and returns a floating-point number. The evaluate service of the provider receives a function object (such as "bid", "ask", or "last") with specified parameters (e.g., "IBM") and returns the current price for the specified stock symbol(s).

BRIEF DESCRIPTION OF THE FIGURES

The foregoing and other features of the present invention will be more readily apparent from the following detailed description and drawings of illustrative embodiments of the invention in which:

FIGS. 9a and 9b are illustrative group and function selection menus at the client.

DETAILED DESCRIPTION OF THE PREFERRED EMBODIMENTS

Figure 1:
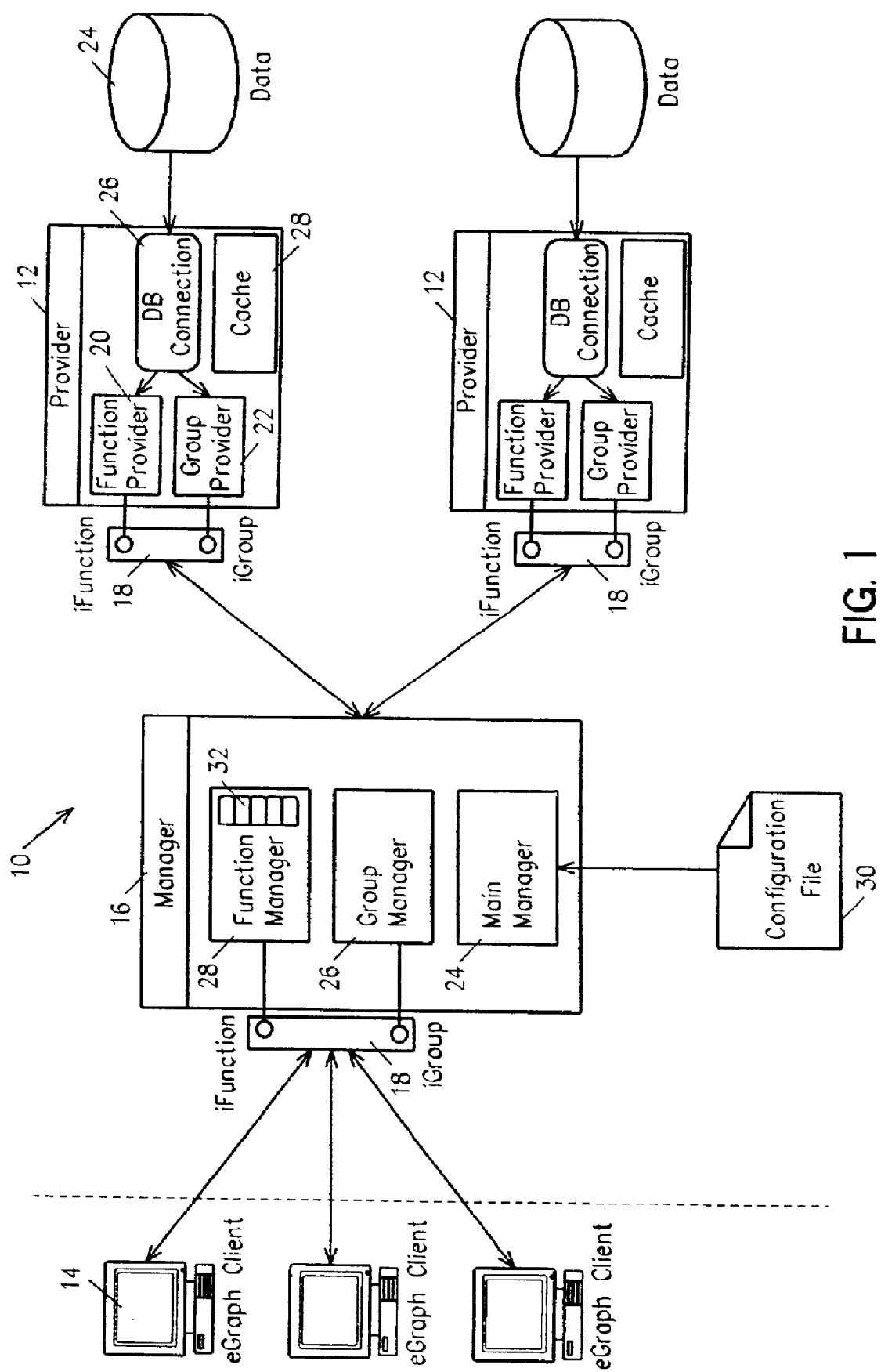
FIG. 1 is a high level view of a distributed function system 10 in accordance with the present invention.

FIG. 1 is a high level view of a distributed function system 10 in accordance with the present invention. The system 10 is comprised of one or more providers 12 which can be accessed by a plurality of clients 14 through a conventional network connection, such as the Internet, an intranet, LAN, etc. (not shown). Providers 12 support distributed functionality which can be used by the clients 14 through a standardized provider interface 18. Providers can also supply group information which organizes sets of parameter values that can be applied to the supported functions.

Providers can be connected to each other in a hierarchical manner and accessed either directly or accessed via a hierarchical "manager" 16 to allow function from multiple providers to be accessed. In particular, to support hierarchical implementation, additional functionality can be included in a provider 12 which permits it to present the functionality of "descendent" providers through the interface 18. For purposes of illustration, this functionality is discussed with respect to a separate manager 18 which is connected between the providers 12 and the clients 14. The manager 18 coordinates access by the clients to the functions and group data supplied by downstream providers 12. In practice, the functionality of manager 18 can alternatively be included as part of a provider 12.

In the context of the present invention, a function is a procedure or data request which operates on one or more specified parameters and returns result data based upon the parameters. The parameters for a given function are preferably selected from a predefined set of parameter types. The client software can be developed with awareness of this set of parameters so that the client software can correctly provide parameters specified by a given function object. Although not required, in the preferred implementation, at least one of the parameters for each function object is a group identifier. Groups are sets of one or more "atoms" which specify specific items, such as ticker symbols, names of companies, or names of people. In a specific implementation of the present invention, the groups comprises sets of one or more financial security identifiers, such as index or risk class, and the function will return financial information or analysis about the securities in a specified group, such as the last closing price for each security.

The providers 12 (and manager 16) have a standardized provider interface 18 which comprises an function interface component implementing a set common services used to obtain information about and execute functions. A group interface component can also be provided to process and return group information. While a typical provider 12 will supply both functions and group definitions, in some implementations only functions or groups are provided and, in these embodiments, only the corresponding portion of the interface 18 need be implemented.

Because the interface is standardized, the implementation of the provider functionality behind the interface can vary without affecting the performance of the client systems and other providers in the network. In a typical implementation, a provider 12 comprises a function provider module 20 and a group provider module 22 which implement the respective portion of the interface 18 and related functionality. The function and group provider modules 20, 22 can be connected to one or more suitable data sources, such as a database 24, through an appropriate data connection 26. The data sources 24 can contain information regarding the configuration of the provider 20, the function objects and defined groups, and can also contain or otherwise provide information needed to evaluate the various functions. For example, one data source can comprise a database which contains historical pricing information for various securities while a second data source comprises a real-time feed of current price information. A cache 28 can also be included in the provider 12 to decrease processing time. A specific implementation of the cache 28 is discussed below.

The function portion of the interface 18 implements a provide( ) service which returns functions supported by the queried provider 12. In a hierarchical implementation, the provide( ) service can also return the functions supported by downstream providers connected to the queried provider. The function portion of interface 18 also implements an eval( ) service which takes as an argument one of the functions with a specific set of parameter values and returns an object containing a result of the evaluation of the function on the specified parameters.

The supported functions can be distributed to clients in a number of different formats. Preferably, the provide( ) service returns functions as respective structured data objects which contain a function name and the parameters which apply to the function. In a specific embodiment, a function object also contains a unique function ID, an indication of the function provider, as well as other data, such as a category of operation in which the function may be used and an external name for use.

The function parameters are preferably represented as structured objects within the function object which specify the parameter name and the order in which the parameter is specified in the argument list. Additional data can also be included, such as a default value for a parameter, restrictions on the range of values for the parameter, a unique parameter ID, data typing information, etc. In addition, class names can be specified for the function and parameters to allow the object to be manipulated in a Java or similar environment.

A provider 12 can also implement a group interface component through the group provider module 22 which supports functions for publishing data types, data objects, and groups of objects on which the functions can operate. The group functionality is useful when clients use functions that generally operate on a limited set of possible parameters and where the members of the set and the various groupings in the set can vary. For example, in a financial analysis system, the universal set of atoms can comprise valid identifiers for all nationally registered securities. This set can be organized into various and possibly overlapping groups of securities, such as the DOW or NASDAQ index or various sector and risk groupings. In the particular implementation discussed below, the functions implemented by provider 20 are configured to return information about specified atoms, such as the price of securities in a given group. However, the invention is not so limited and various other types of functions can also be implemented.

In a particular embodiment, the group interface component implements a getAtoms( ) service which returns one or more lists of objects or atoms of each data type, where each list is preferably identified by a text string that is unique for its type. For those cases where it is impractical or impossible to return the full list of atoms, this service can return an indication that the atom universe is "open", i.e., any atom is valid. A getGroups( ) service can be implemented to return data specifying defined logical groupings of the atoms. The group data is preferably returned in a tree-like data structure having one or more top-level group nodes for major groups and lower level nodes for sub-groups. A getTypes( ) service can also be provided to return a list of types of objects, each identified by a text string.

In accordance with a specific embodiment of the invention, a client executes a function by modifying a function object received in response to a provide( ) request and returning the modified object to the provider via an eval(<function>) call. In particular, the function object is updated to contain the actual parameter values of interest. A copy of the original, unmodified function object will generally be retained at the client to permit the function to be called multiple times.

Figure 2:
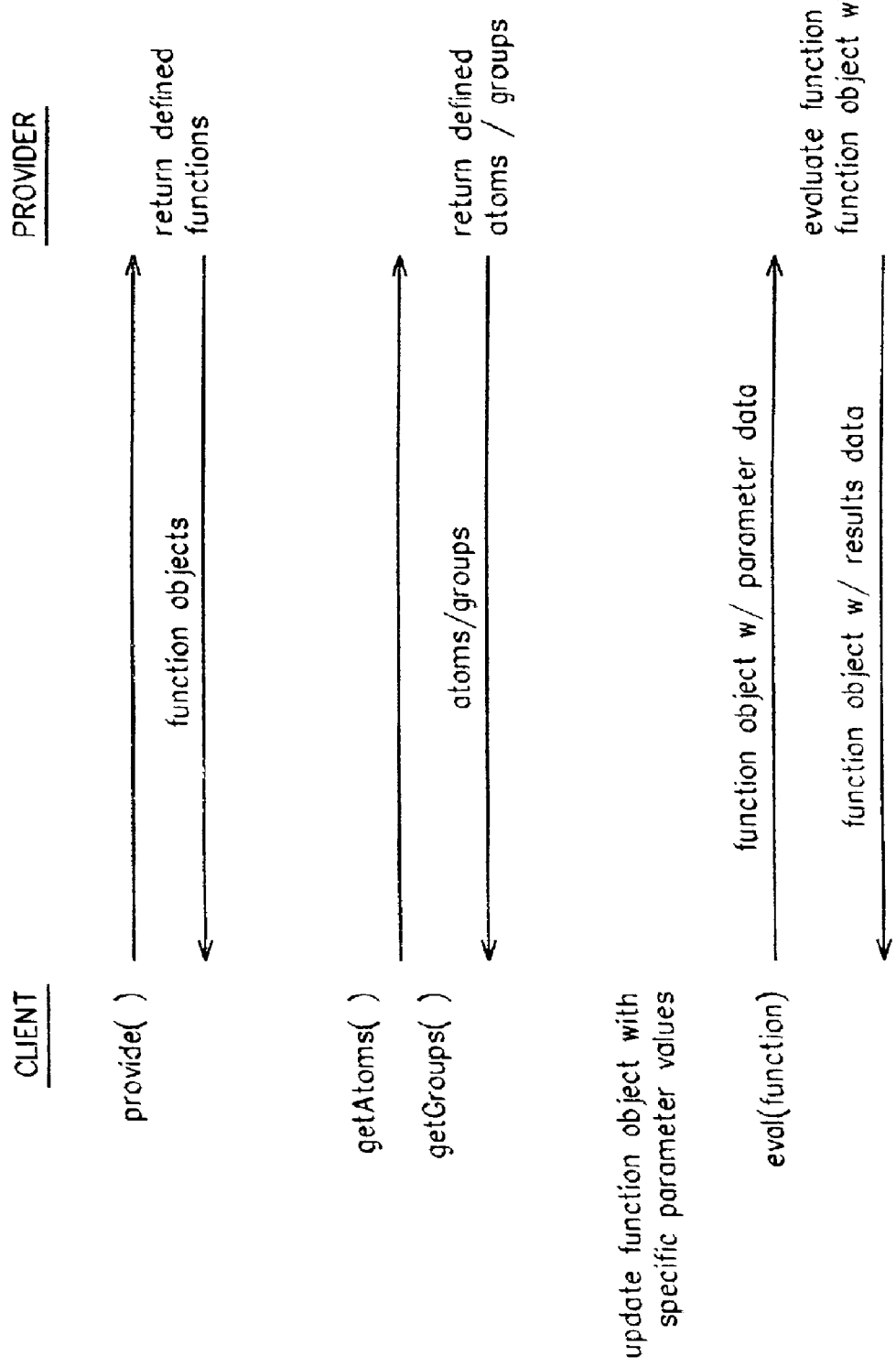
FIG. 2 is a high-level flow diagram summarizing the process for executing functions.

The updated function object is sent to the connected provider 12 or manager 16. If the receiving server is not the provider of the received function object, that server issues an eval( ) request to the appropriate downstream provider 12 and passes the received function object as an argument. The process continues as the function object is received by the provider that will evaluate it. After the function object is received by the provider of that function and evaluated, the results of the evaluation are then returned to the client. Preferable, the results are returned by storing the results in the received function object and then returning the function object to the client. This process is summarized in the diagram of FIG. 2.

For example, a "LastPrice" function can be supported by a provider 12 which will return the last recorded price for one or more specified securities. A simplified function object can be of the form:

```
FunctionName = LastPrice
Provider = SourceX
Parameters:
    Position 1:
        ParameterName = group
        DefaultValue = <nul>
        Value = <nul>
    Position 2:
        ParameterName = date
        DefaultValue = current
        Value = <nul>
ReturnName=Price
ReturnValue=<nul>
```

Other fields, such as data typing information can also be included. In addition, a "category" element can be defined and used to specify the general type of function, such as "market data" or "position data". This information can be used by a client or other system to organize a set of functions into various categories and sub-categories to permit a user to more easily locate a particular function of interest.

The original function object definition preferably contains elements for storing the parameter values and return values. These elements, which will typically be undefined or contain a default value, can be used by a client to simplify the process of updating a function object to contain desired parameter values and to contain function evaluation results. However, in an alternative embodiment, these elements are not pre-defined, but instead can be added to the function object as needed. Thus, the "value" element for the parameters would be added and defined by the client for the specified parameters, possibly leaving a default value for unspecified parameters, and the ReturnValue element added by the provider when the function is evaluated. Other variations are also possible.

A client 14 would receive this function object in response to issuing a provide( ) request to a connected provider 12 or manager 16. To execute the function, the client can modify the object, or a copy thereof, to specify a particular value for group parameter, for example "IBM", and then transmit the modified function object to the provider using the eval ("LastPrice") service. The provider 12 would determine the last price for the specified security, update the received function object to contain this price data in the ReturnValue element, and then return the result-containing function object to the client. The specified ReturnValue can then be extracted by the client and used as needed.

As noted above, a group can contain one or more elements. Although multi-element groups, such the DOW or NASDAQ index, can be referenced by its name, preferably, the actual contents of the group are specified in the group parameter element to allow the provider to evaluate functions without having specific knowledge of the group definitions. This permits a client or other provider to specify customized groups without having to distribute the group definitions to the function evaluating provider. When a multi-element group is specified, the provider will preferably execute the function against each element in the group and update the object with a corresponding set of return values. Thus, to determine the last price of the securities in the Dow Jones index, the function object would be modified by the client to specify the securities in this index in the group parameter element and the provider would return the last price for each of the specified securities.

Provider servers 12 can be arranged hierarchically and provide functions themselves as well as act as a function gateway between a client and a downstream function provider. As discussed above, to provide access to a network of servers, a manager 16 can be used to interface between the clients 14 and downstream providers 12. The manager 16 can co-ordinate and prioritize activities between the various providers 12 and the client 14. Preferably a single manager 16 is provided between the client 14 and one or more providers 12 such that the client need only communicate with the manager server 16 which is then responsible for coordinating access to the various providers 12.

The tasks performed by the manager 16 during startup are coordinated by a main manager module 24. A group manager module or class 26 is provided to manage group information from downstream providers and support the group component of the interface 18 and a function manager module or class 28 is provided to manager function objects provided by downstream providers 12 and support the function component of the interface 18 by acting as a delegator for the Provide( ) calls and Eval( ) calls coming from the client. (See FIG. 1). As will be appreciated, the group manager 26 and function manager 28 can be implemented in conjunction with a group provider 22 and function provider 20, respectively, in a provider 12 as opposed to a more dedicated manager 16.

Figure 3:
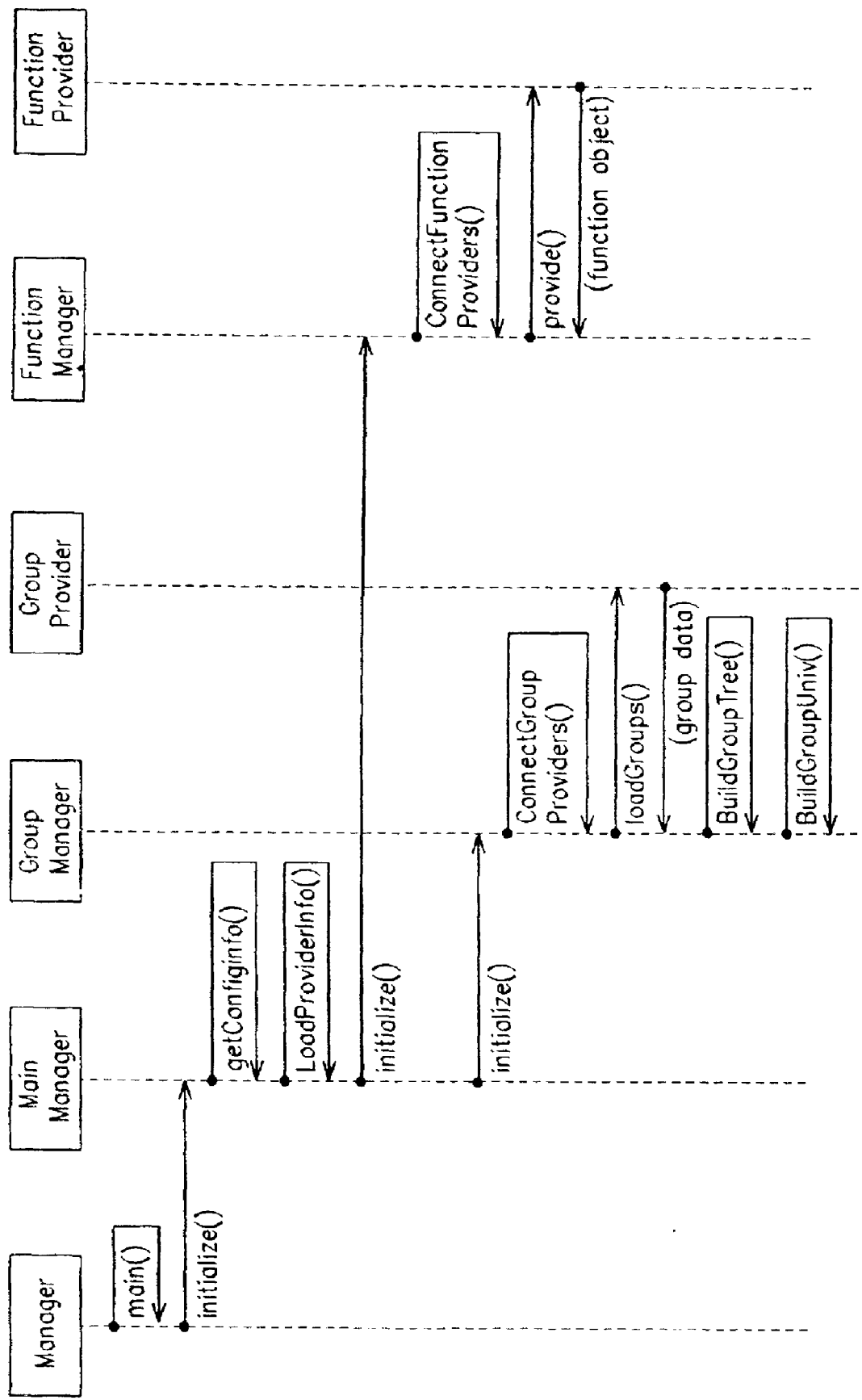
FIG. 3 is a high-level flow diagram of the activities performed by a manager or provider support hierarchical function management.

Turning to FIG. 3, there is shown a general flow of the series of activities performed by the manager 16 (or manager functionality in a provider 12) in order to provide hierarchical function management. When the manager is initialized, the main manager module 24 first identifies relevant data sources and retrieves information about the group and function providers which should be accessed by the manager 16. This information can be specified in one or more suitable configuration files 30 or other sources and retrieved via appropriate functions.

Second, an instance of the function manager 28 is created, if necessary, and passed information about the relevant function providers. The function manager will bind to each function source and start up the service. The function manager loads functions from each provider using the Provide( ) method and stores copies of the returned function objects locally. Preferably, the function manager creates a map 32 of all the functions and their source to permit it to delegate eval( ) calls coming from a client to the provider associated with the function object carried in the eval( ) call.

Third, an instance of the group manager 26 is created, if necessary, and passed a list and possibly other information about the relevant group providers. The group manager 26 connects to each specified group provider and loads the groups from the provider. The returned group data can be stored in one or more group provider objects which can be organized in a hierarchical format, such as a tree with one or more top and intermediate nodes indicating defined groups and wherein the leaf nodes are the individual atoms. The information from the various group providers can be combined by the manager into a single tree and a group "universe" comprising the members of the groups from the various connected group providers generated.

As discussed previously, a group is essentially a collection of atoms. However, atoms can be organized into a hierarchy of groups and therefore a group can be considered a set or collection of groups or atoms. The groups could come from various sources. Any source can provide group objects using the group component of the interface 18. To handle group functionality, the interface 18 to the manager 16 provides a single entry point from the client to the various providers such that the group manager "hides" the group providers from the client and handles group specific client interaction on behalf of group providers. The group manager 16 also acts as a delegator for communications between the client and the various group providers.

Once the manager 16 is initialized, it can begin processing requests from a client. A connecting client 14 will generally first issue provide( ) and loadGroups( ) requests to the manager 16. This request is processed by the function manager 28 portion of the manager 16 which returns the set of defined functions which have been gathered from the specified function providers 12. Preferably, the functions are returned as a set function objects, where each object is associated with a particular function. However, functions can also be returned in other formats, such as an aggregated object, sets of lists, tables, or other formats which will be understood by those of skill in the art. Similarly, the group manager 26 portion of the manager 16 will return group information which has been gathered from the specified group providers. Under certain circumstances, the function and group managers 28, 26 may request updated data from the respective providers prior to responding to the client.

When a client issues an eval( ) to the manager, the function manager 28 determines the provider 12 associated with each function object carried by the eval( ) request and issues an eval( ) to the respective providers 12 containing the associated function objects. The function associated with a received function object can be evaluated by the provider 12 in any suitable manner so long as the function provider 20 complies with the interface requirements.

Figure 4:
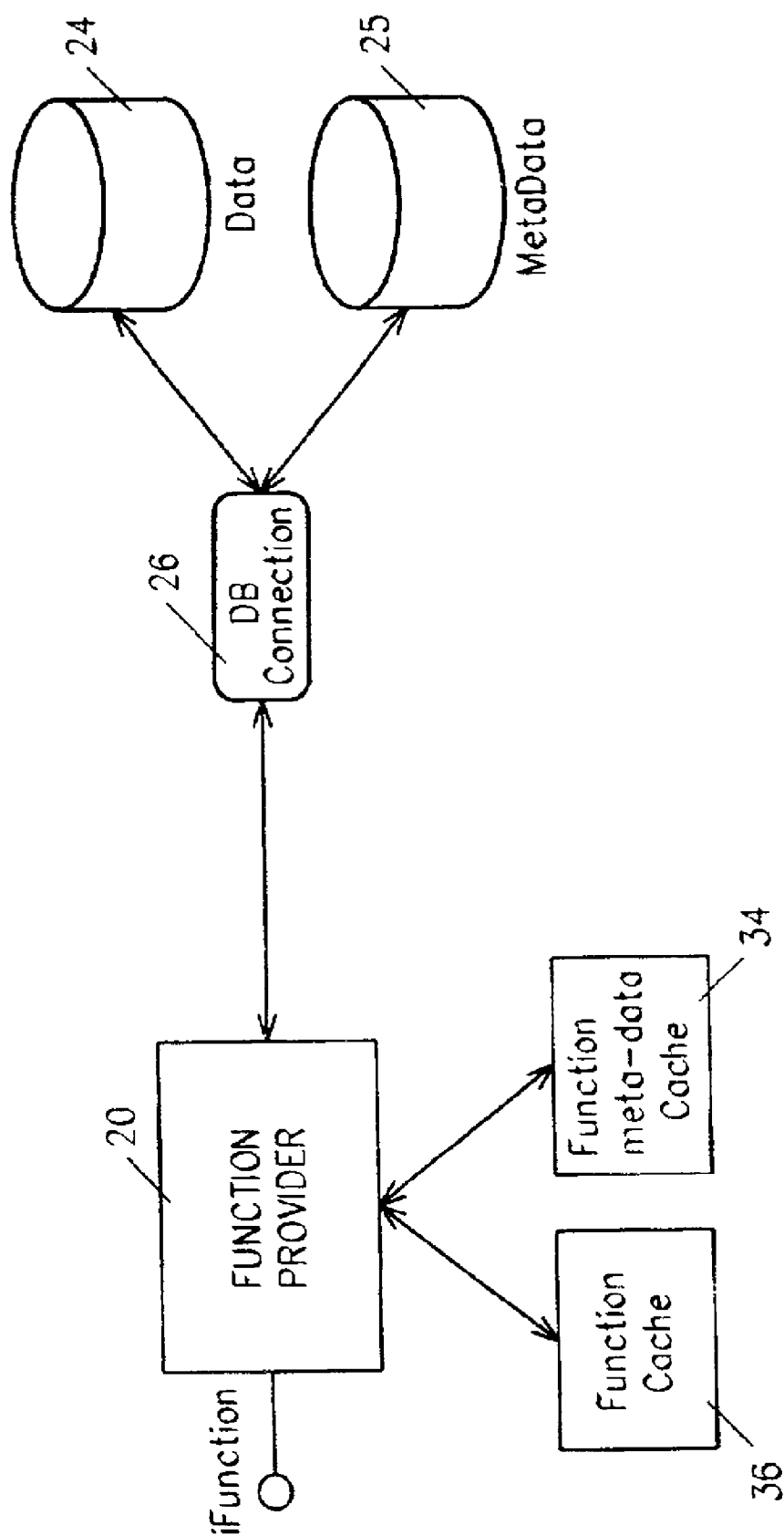
FIG. 4 is a high-level diagram of a function provider.

A general architecture for a preferred structure of a function provider 20 is shown in FIG. 4. As illustrated, the function provider 20 is connected to a data store 24 containing information needed to execute the supported functions and can also be connected to a meta-data store 25 which contains information defining the functions themselves. The function meta-data store 25 can be a database, a ram, or other data storage area. The function definitions can be stored in various ways and the definition processed to generate function objects. Alternatively, hard-coded function objects can be stored in the meta-data store 25.

A function meta-data cache 34 and function cache 36 can also be provided to speed the execution of the system. The function cache 36 is used for evaluating functions in response to a client eval( ) invocation on a function provider and the function meta-data cache 34 for generating the function objects and other meta-functions. The caches can be initialized during start up of the function provider.

Figure 6:
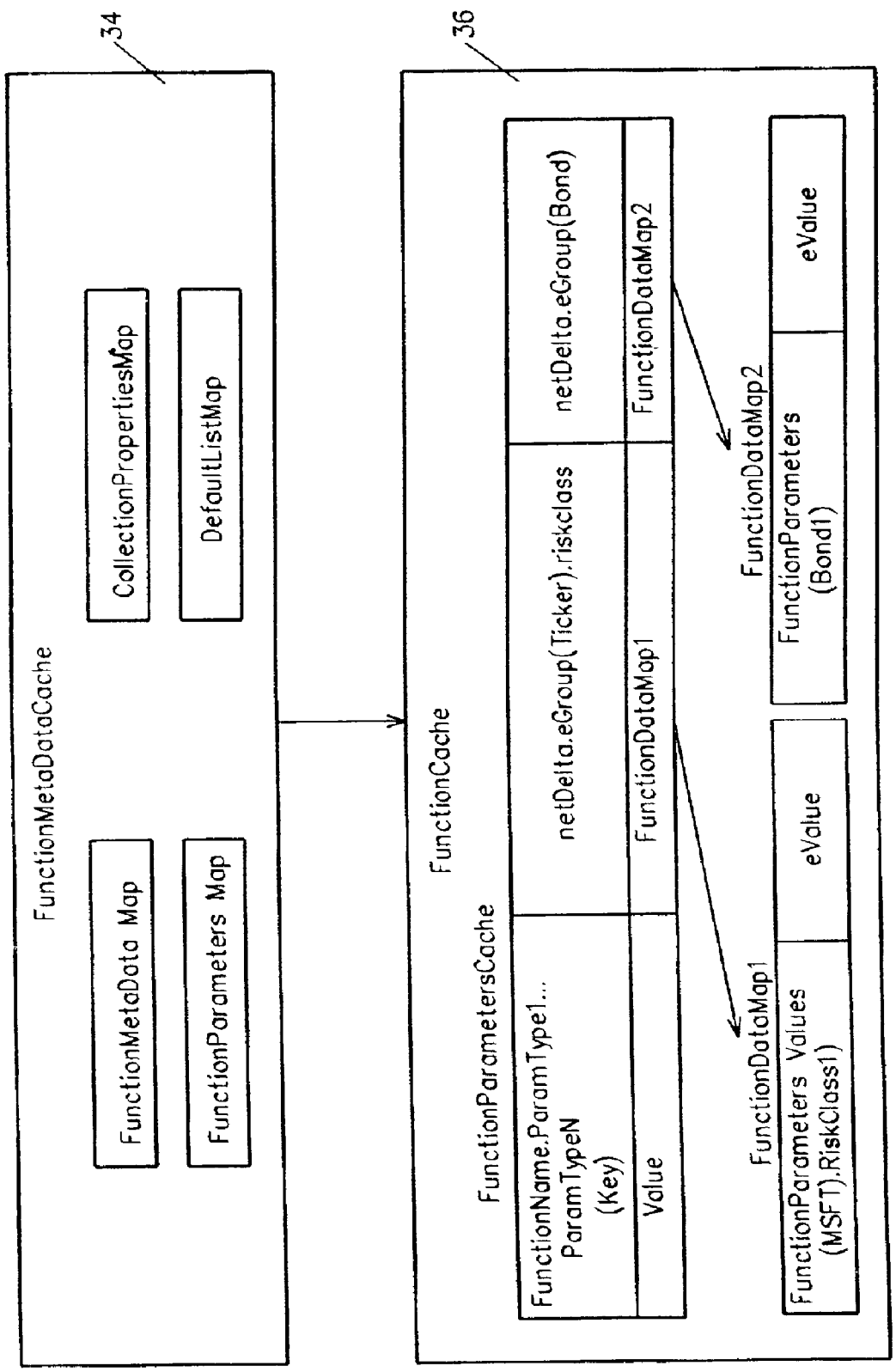
FIG. 6 illustration of a particular embodiment the function meta-data cache and function cache of FIG. 5.

There are two general types of tables associated with functions which can be cached—function meta-data tables or maps, which are stored in the meta-data cache 34, and function data tables which are stored in the function data cache 36. Function meta-data tables describe the supported functions themselves and comprise one or more of general meta-data, applicable function parameters, default values, and various other properties. The tables will generally contain more information about the function then is included in the function object delivered to a client. Such additional information can specify, for example, whether the function can be evaluated from cached data or whether fresh data must be retrieved each time. The Function Data tables are used to store the values associated with the functions. An illustration of a particular embodiment of the contents of the function meta-data cache 34 and function cache 36 is shown in FIG. 6.

During initialization, the caches can be created and loaded. Initially, configuration information is accessed (such as from a config file or command line parameters passed in initialization) and the names of the various tables used to store function-specific meta-data are determined. The tables can then be loaded into memory and used to initialize the function meta-data cache 34. This cache can then be used to construct the function objects as needed. Preferably, a function map is generated which specifies each function by name and associates it with a set of parameter types. There are several possible ways in which the function data tables can be specified. In general, however, the table will associate function names with the various function attributes to simplify retrieval of function object and other related data. In particular, each function can be associated with an SQL or other appropriate statement which will retrieve the function parameter values and the return value. The SQL statement can be generated on-the-fly or be predefined in the function meta-data. Other methods for associating a function with a method of evaluation can also be used, such as specifying or linking to a software procedure or other process which implements the function.

The function cache 36 is preferably comprised of two maps. The first map is a the Function Parameters Cache, which associates a function name with the appropriate parameter types. The second map is a Function Data Map. A separate Function Data Map can be specified for each list of specified function parameters wherein the <FunctionParameters> value is used as a key to the table. The value in this map associates a specific set of parameter values with the results from evaluating a function using those parameters.

Figure 5:
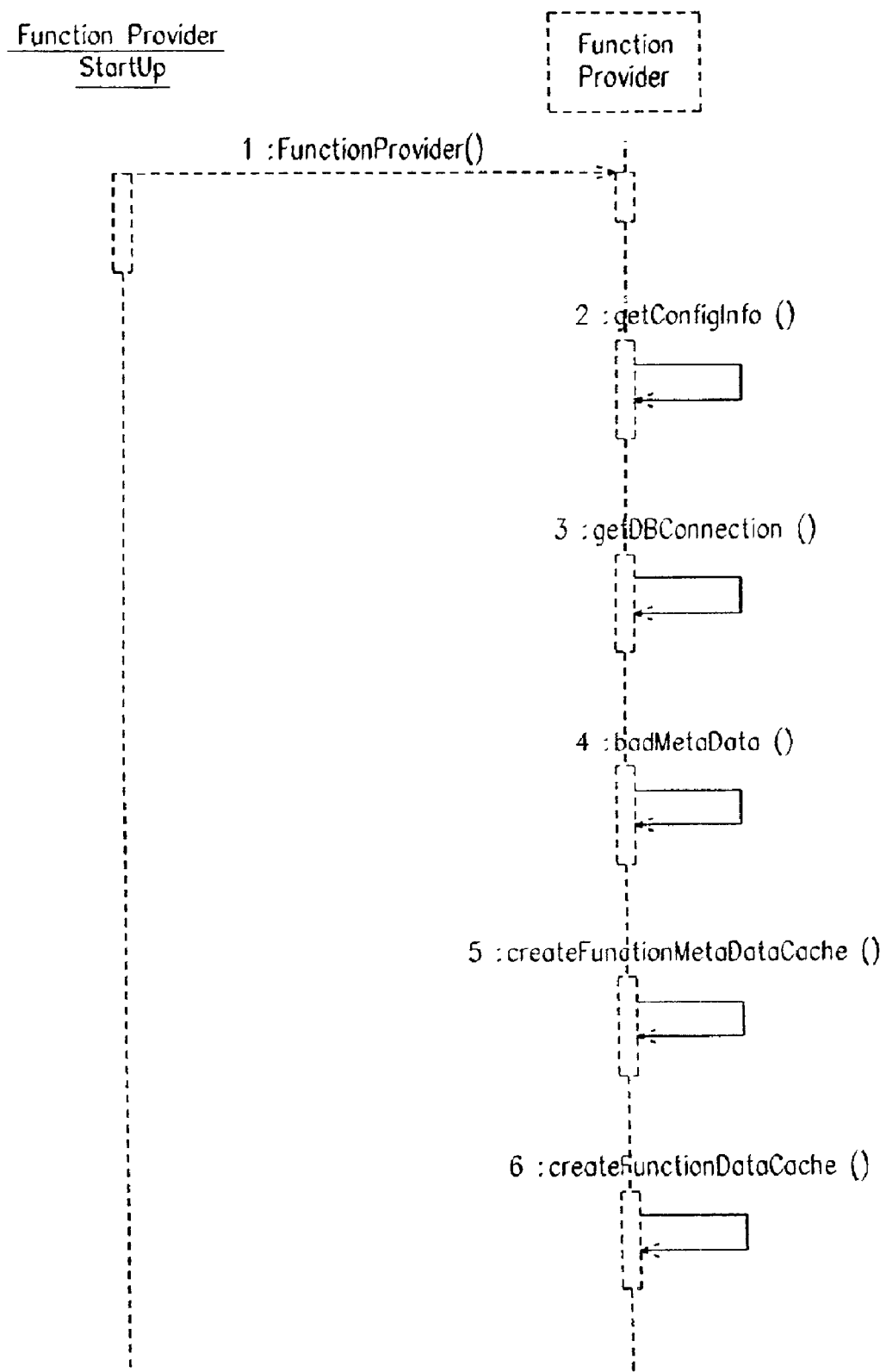
FIG. 5 is a high-level flow diagram of a preferred set of activities performed when initializing a function provider.

Upon receipt of a provide( ) call, the function provider accesses the function meta-data cache 34 to retrieve information needed to create the function object collection. The data can be retrieved by iterating through each row in the row in cached function meta-data map, retrieving a function ID, and then iterating through the function parameters map to retrieve the associated parameters for the function. Similarly, for each associated parameter, the respective ID can be retrieved and used to access a default values map to retrieve any defined default values for the parameters. The parameter ID can also be used to access a valid AtomTypeMap to retrieve the valid atom types associated with each function parameter. Other data can also be retrieved. The flow for starting up a function provider is summarized in FIG. 5.

When a Client sends an eval( ) call to the manager 16 to evaluate a function, the function manager delegates the eval( ) call to the appropriate function provider(s) by iterating through the one or more function objects passed in the eval( ) call, determining which provider(s) the function should be evaluated by, preparing separate a function collection for each respective function provider, and issuing an eval( ) call is then made to each of the appropriate function providers with the relevant function collection. The function manager can maintain an internal map which associates functions with specific providers. Alternatively, or in conjunction, function objects can include data identifying the function provider and the manager can act on this data accordingly.

Figure 7:
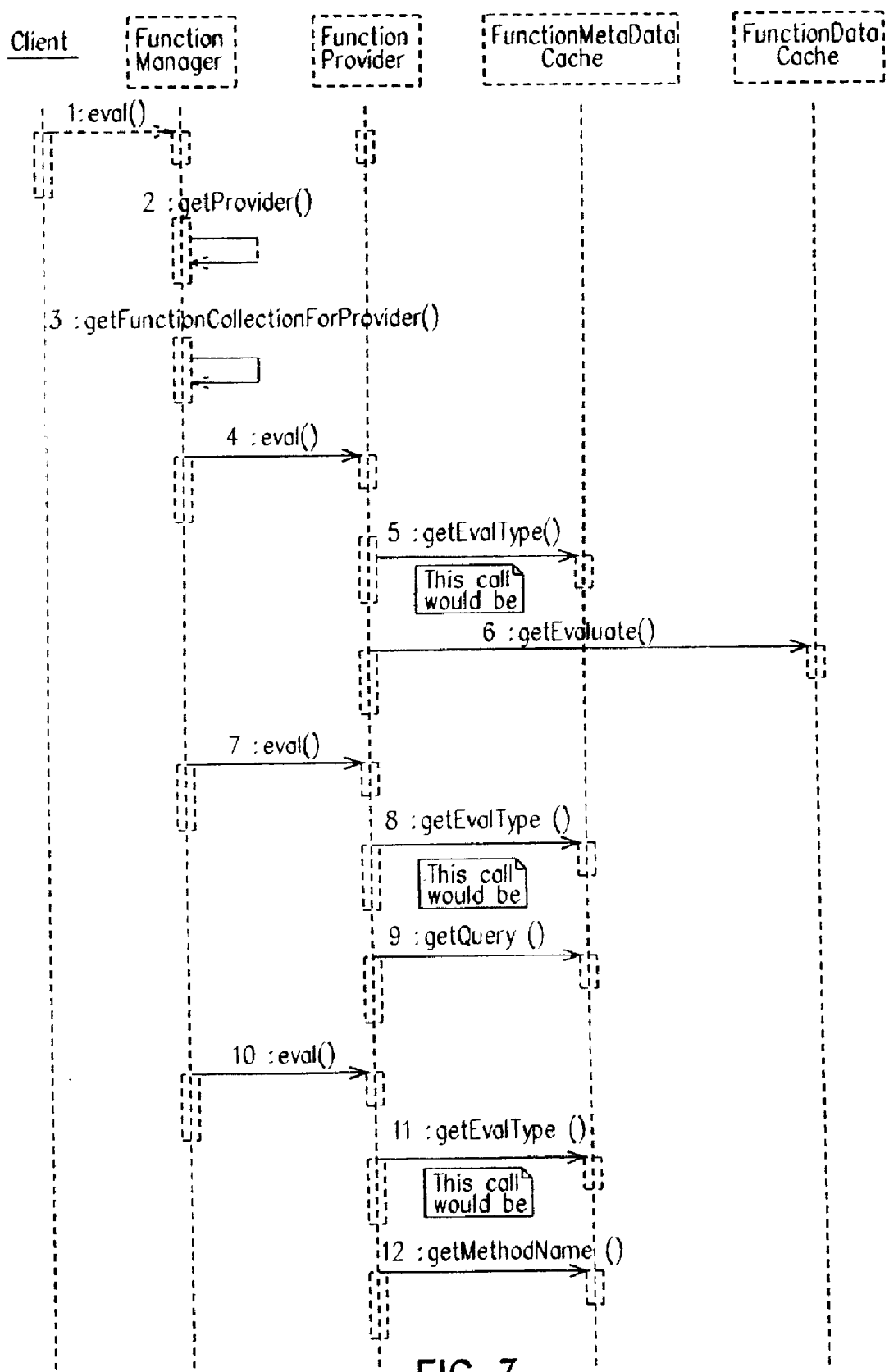
FIG. 7 is a high-level flow diagram showing the issuing and evaluation of an eval( ) service request from the client and function evaluation at the provider.

Once the function manager delegates an eval( ) to the appropriate provider, the function provider can evaluate the function in a number of different ways, such as retrieving data from a local cache, or evaluating the function with reference to external data. The manner in which a function should be evaluated can be specified in the function meta data maintained at the respective provider 12. In a preferred embodiment, when a function provider receives an eval( ) the function provider accesses the function meta-data to determine the type eval( ) to perform. The eval( ) flow is summarized in FIG. 7.

For example, if the eval type is of "function data cache", then the return value for that function can be stored in the function data cache maintained by the provider. The cache can be accessed to retrieve the result data when a subsequent eval of the same function is received. In the event of a cache miss, the function can be evaluated using a separate mechanism and the results stored in the cache. For an "SQL" eval type, the function provider can retrieve an SQL query string from the function meta-data and execute the query against an appropriate database. For a "return" type function specification, such as "JAVA", the function provider can load a corresponding JAVA class and execute a method to get the return value or execute a specified custom function in an other appropriate manner. Different function evaluation techniques can also be specified at various levels of complexity. For example, a function which returns a current price of a security can be configured to be executed one way during trading hours, e.g., to retrieve the price from a real-time price feed, while at other times the function is executed against a data cache or historical price repository. Other variations will also be appreciated by those of skill in the art.

It is often beneficial to be able to notify clients about the universe of values a particular parameter can take, particularly when the permissible values can change on a recurring basis. This is particularly true for functions which return information about objects in a set, such as functions which return financial information for one or more specified securities. As discussed above, such current group information is preferably provided to the user through the group interface component which can be implemented by a group provider 22.

The group information can be organized in many different ways. In a preferred embodiment, each group provider 22 builds several group structures during initialization and passes these structures to a requestor, such as a client or higher-level provider, in response to a loadgroups( ) call. Preferably, the group information is packaged in a group container object. In a particular implementation, the group provider generates or retrieves a group tree which organizes the definitions of various groups and sub-groups in a hierarchical manner. A group universe map can also be generated which lists all of the defined groups and links a specified group name to an actual group object. In addition, an atom universe map can also be provided to specify the complete set of possible atoms and link an atom name with an atom object.

Depending on the type of functions being provided and the operations at the client system, other structures can also be defined. For example, a Color Hierarchy can be defined which associates a group name with a specific display color. This information can then be used by the client when displaying information about atoms in the group.

The group manager 26 in the manager 16 implements a group interface component which gets exposed to the client and acts as a single entry point for group functionality from the client, hides the specific group providers 12. The group manager can maintain a map between the provider name and the corresponding group object reference. When a client requests updated group information, this map can be used to forward the dynamic group's call from the client to the specific group provider, if needed, and the returned updated group information processed and returned to the client.

In the preferred implementation, during initialization the group manager 26 iterates through the list of group providers specified by the main manager 24 (in accordance with the configuration data). The group manager 26 then issues loadGroups( ) calls to each group provider and receives a group container containing the group universe, group tree, and other data from each provider. The group information is then consolidated.

During the process of consolidating the group trees, the group manager iterates through the root nodes of one group tree and compares the nodes with the root nodes from a group tree received from another group provider. If a root node is different, the Group Manger appends the unique node to a consolidated Group tree. For any node that is not unique (for example, a "ticker" group coming from 2 Group Providers), the set of immediate descendent nodes are compared for each group and a combined set is generated in the consolidated group tree. The process continues until all of the trees have been merged to form the consolidated tree. Various specific techniques for merging hierarchical tree structures known to those of skill in the art can be used in the consolidation process.

Once the consolidated group tree has been built, the group universes from each provider are consolidated. Other group data from the providers, such as a color hierarchy map, are also consolidated and the information can be combined to form a consolidated group container which can be delivered to a client upon request. Similarly, the group manager can consolidate the various atom universes. Generally, atom universe consolidation only needs to be performed when two or more providers provide an atom universe of the same type. For example, if a "Tickers" universe specifying as atoms the stocks listed on a given price ticker is obtained from different providers, the group manager can consolidate the two universes into a single ticker universe object.

Although many groups are pre-defined, the members in some groups can be dynamic in nature and a client can request that the contents of a group be reloaded from the provider, e.g., by passing the group object or group identifier in a loadGroup( ) call to the group manager. The group object has an associated provider name. When the Group Manager receives a loadGroup( ) call, it determines the associated group provider and issues a respective loadGroup( ) request. In the event that the group specified by the client comprises sub-groups which come from different providers, the group manager can make separate calls to the various providers, combine the results, and return the data to the client. As will be appreciated, the group manger may need to take various actions when it receives the updated group object to consolidate the new information with the prior data available.

The interface and related functionality can be implemented in a number of ways. In a preferred embodiment, the manager 16 and providers 12 are implemented using conventional computer server systems as is the client system. Communication between the various clients and servers can be coordinated using a CORBA methodology. The various functions and interface services are preferably implemented using JAVA programs.

In the embodiment discussed above, all clients are considered to be equal. In an alternative embodiment, a client may be given only limited access to the various functions, groups, or providers based on a particular client profile, security level, or the like. In this embodiment, when a client connects to the manager and issues a provide( ) or getGroups( ) request, the authorization level of the client is determined and only those functions and/or groups which the client is permitted to use are returned to the client. Advantageously, the authorization check only needs to be conducted when a client requests a set of function objects or groups. Because functions are executed by a client by returning a function object to the provider, the client can only execute functions for which it has received a function object. Some changes in the manner in which the manager systems consolidates function objects and group data supplied by the providers will be needed ensure that if some functions or groups are not sent to a given client, the remaining information is internally consistent. Appropriate modifications can be implemented by one of ordinary skill in the art without undue experimentation.

Advantageously, the distributed functionality provided by the present invention allows networks of function providers to be easily created. Because each provider publishes information about the supported functions at the time of connection or when requested, a client can dynamically adjust its operation to the functions available at a given time, e.g., by presenting or disabling various program functions in appropriate user-selection menus, without requiring updates to the client software. The invention is particularly well suited for use in client systems, such as a graphical analysis system, which permit a user to select one or more of a number of different functions to be executed on a specified group of data.

A particular system which makes use of the present invention is a graphical financial data analysis system. The system, referred to herein as "eGraph", comprises a number of tools which can be used to display and analyze financial data related to various securities, industries, risk groups, etc. The user can select various types of displays and analysis from appropriate menus, such as graphs, charts, and tables. In accordance with this aspect of the invention, the functions and data groups to which the functions can be applied are provided, at least in part, by provider systems 12.

When the client 14 initially connects to the function network, e.g., via manager server 16 or otherwise, it issues a provide( ) and a loadGroups( ) request. The information returned to the client is used to dynamically establish the set of functions which are available to a user at the client as well as the groups of items to which the various functions can be applied. It should be understood that certain functions can be implemented in the client system directly and made available in addition to the functions supported by the function providers and thus the set of functions available for selection by a user can include both local and remote functions.

Figure 8:
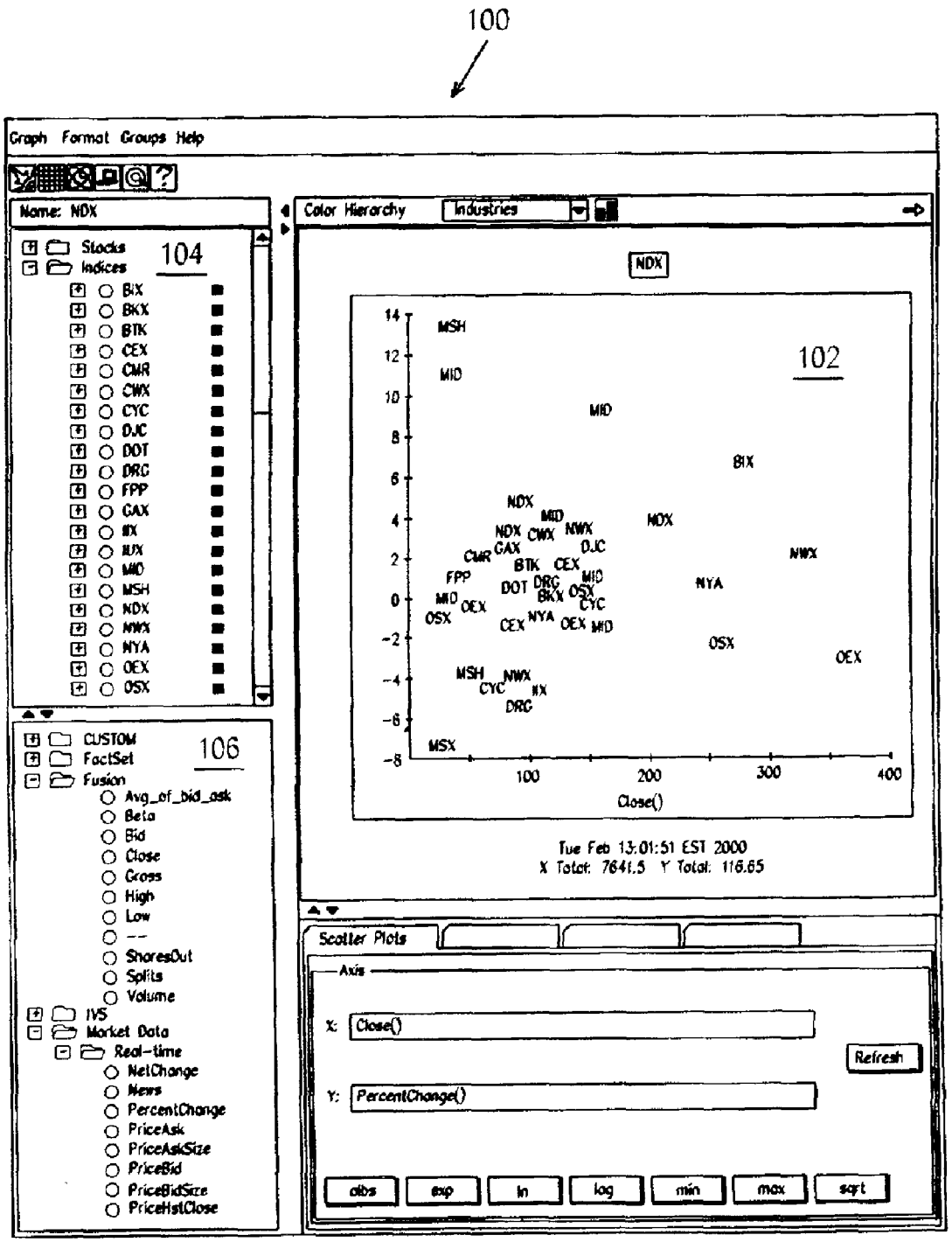
FIG. 8 is a sample screen view of a display screen in a data analysis client in a system according to the invention.

FIG. 8 is a sample screen view of an eGraph display screen 100. The screen 100, which can be accessed by selecting an appropriate program function, has a data presentation area 102 in which selected information is shown, e.g., in the form of a graph. The screen also contains a group selection menu 104 and a function selection menu 106.

A user of an eGraph client system can select the type of data display desired, such as a scatter plot. The group of data to be analyzed is selected with reference to the group selection menu 104. The selections available in the group selection menu 104 are comprised of the group definitions provided by the manager 16 in response to the getGroups( ) request and can also include customized groups defined by the user. The groups can be organized in any suitable manner for presentation. Preferably, the groups are displayed in the form of a conventional selection tree. A user can select on a folder icon which represents a group tree root-node and then select associated groups within the folders at varying levels down to the specific atomic symbol. While the selection menus 104, 106 are preferably included in on the same screen as the presentation area, alternatively, the group and function selection menus 104, 106 can be displayed in separate windows, such as illustrated in FIGS. 9a and 9b. Other menu selection techniques can also be used, such as pull-down menus, etc.

A user can also have the option to select one or more functions to be processed and displayed, such as in a scatter plot. Preferably, the function selections are also arranged in a tree structure which can be organized in accordance with the specified category for the various function objects. The set of specific functions presented for selection at a given time can adjusted by the client in accordance with the type of display or other general operation selected by the user.

After one or more functions have been selected, the functions are be executed using the selected group by modifying function objects associated with the selected functions to include the appropriate groups and then issuing an eval( ) call containing the function object(s). The returned data can then be processed at the client and a suitable display presented to the user. In a particular implementation, the color in which to display the function data is specified by the manager or provider on accordance with information in the color hierarchy.

In the example shown in FIG. 8, the user has selected to display a scatter plot of the group NDX which shows the percent change of price of the members in the group vs. the closing price. However, and as will be appreciated by those of skill in the art, the data returned in a function object can be processed in any manner by the eGraph system and a wide variety of other types of data displays, of varying degrees of sophistication can be implemented. Similarly, the while the example functions discussed above have been relatively simple, complex functions, such as those requiring access to large amounts of data and/or significant processing power, can also be supported by the providers. For example, one provider system can be configured to return short term Value-at-Risk (VAR) determinations or other risk quantifiers, for a specified group of securities, such as a custom group defined for a specific portfolio.

Figure 10B:
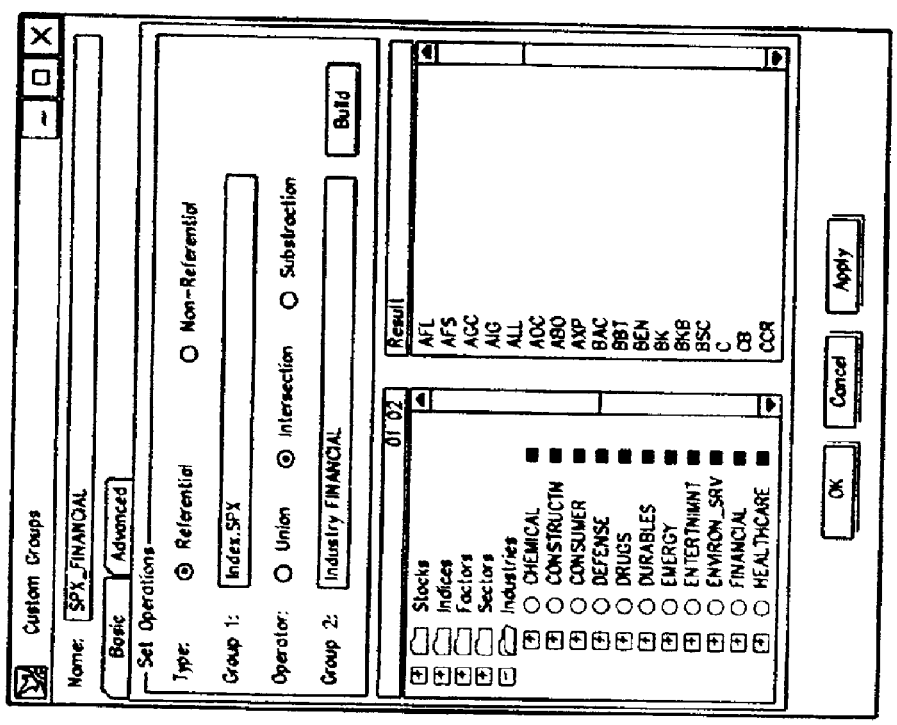
FIGS. 10a and 10b are illustrative custom group definition screens.
Figure 10A:
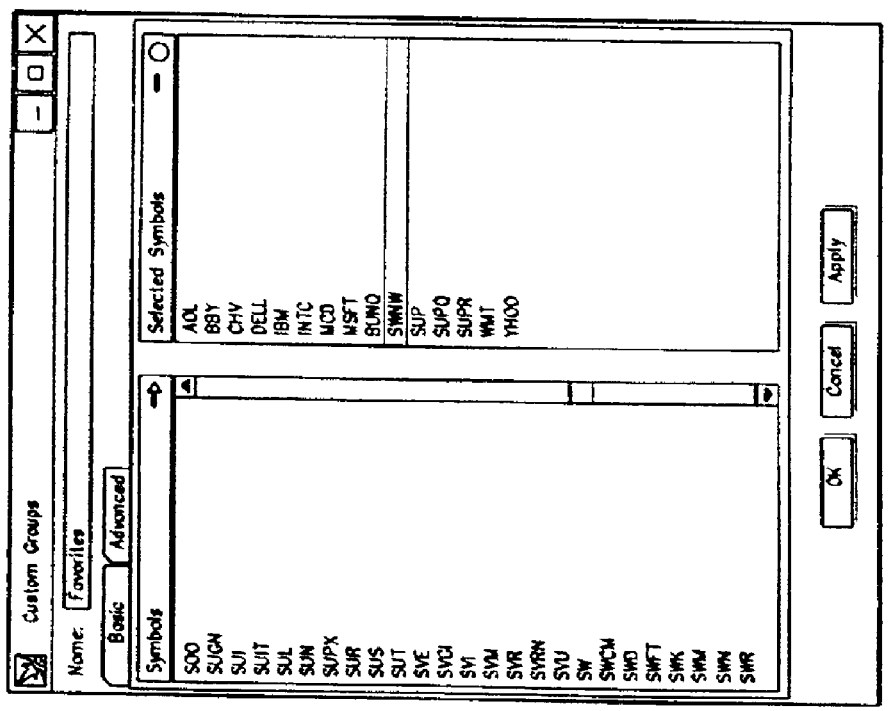

Custom groups can be defined by a user in various ways. Preferably the groups are defined by providing the user with a list of symbols that can be selected to define a group, such as shown in FIG. 10a. In a more advanced group definition, the user can select one or more defined groups (pre-defined or custom) and then define a custom group using various set operations, such as a union, a intersection, or a subtraction of the contents of the selected groups. Other methods for defining customized groups can also be used.

While the invention has been described with reference to a particularly preferred embodiment thereof, variations in the implementation form and detail can be made without departing from the spirit and scope of the invention.

What is claimed is:

1. A system for providing distributed functionality to a plurality of clients comprising:

a first provider server having a function provider module therein;

a data store connected to the function provider module and containing function information defining at least one function object, each function object associated with a function and comprising a function name element and specifying at least one parameter;

the function provider module being configured to:

(a) in response to receipt of a first type request from a requestor, return a set of function objects to the requestor; and (b) in response to receipt of a second type request from the requestor containing a function object having defined parameter values stored there, evaluate the function associated with the function object, modify the received function object to include results of the function evaluation, and return the modified function object to the request or a second provider server:

(c) issue a first type request to a second provider server; and (d) receive at least one function object from the second provider server in response;

the set of function objects returned by the function provider in the first provider server comprising the at least one function object received from the second provider server, wherein each function object further comprises a function ID and an identity of a respective provider server, wherein at least one parameter specified in a function object is a group element in which group data indicating a set of at least one atom can be specified;

the first provider server further comprising a group provider module configured to, in response to a receipt of a third type request from the requestor, return group definition information to the requestor.

2. The system of claim 1, further comprising a second provider server;

the group provider in the first provider server further configured to:
issue a third type request to a second provider server; and
receive group definition information from the second provider server in response;
the group definition information returned to the requestor comprising the group definition information received from the second provider server.

3. A system for providing distributed functionality to a plurality of clients comprising:

a plurality of provider servers; and a manager server connected to the provider servers;

at least one provider server comprising a function provider configured to:
  (a) in response to receipt of a first type request, return a set of function objects, each function object associated with a function and comprising a function name element and specifying at least one parameter; and
  (b) in response to receipt of a second type request containing a function object having defined parameter values stored therein, evaluate the function associated with the function object, modify the received function object to include results of the function evaluation, and return the modified function object;

the manager server configured to:
  (a) issue a first type request to each provider server having a function provider therein;
  (b) store the function objects returned in response to the first type request;
  (c) upon receipt of a first type request from a requestor, return the function objects stored in the data store to the requestor; and
  (d) upon receipt of a second type request from the requestor containing a particular function object, determining a particular provider server associated with the particular function object, issuing a second type request containing the particular function object to the particular provider server, receiving a modified particular function object from the particular provider server, and returning the modified particular function object to the requestor.

4. The system of claim 3, wherein at least one parameter specified in a function object is a group element in which group data indicating set of at least one atom can be specified.

5. The system of claim 4, wherein:

at least one provider server comprises a group provider configured to, in response to a receipt of a third type request, return group definition information;

the manager server being further configured to:
  (e) issue a third type request to each provider server having a group provider therein;
  (f) consolidate group definition information received in response to the issued third type request;
  (g) upon receipt of the third type request from the requestor, return the consolidated group definition information to the requestor.

6. A distributed data analysis system comprising:

a server connected to a network;

a client connected to the network;

the server being configured to:
  (a) in response to receipt of a first type request from the client, return a set of function objects, each function object being associated with a respective function and comprising a function name element and at least one parameter element; and
  (b) in responds to receipt of a second type request from the client containing a function object having defined parameter values stored there, return a modified version of the received function object including results of evaluating the function associated with the function object upon the defined parameter values;

the client configured to:
  (a) issue a first type request to the server and receive the set of function objects on return;
  (b) update a function object associated with a particular function to contain particular parameter values;
  (c) issue a second type request to the server containing the updated function object;
  (d) receive a modified version of the undated function object from the server;
  (e) extract the results from the modified particular function object; and
  (f) generate an output related to the extracted results;
  (g) display to a user a list of function associated with the received set of function objects; and
  (h) receive a selection from the user of the particular function.

7. The system of claim 6, wherein the client is further configured to:

display to the user a list of defined groups; and receive a selection from the user of a specified group, the particular parameter values comprising the user-selected group.

8. The system of claim 7, wherein:

the server is further configured to, in response to a receipt of a third type request, return group definition information; and the client is further configured to:
  issue a third type request to the server; and
  receive group definition information from the server;

wherein the list of defined groups displayed to the user is related to the received group definition information.

9. The system of claim 8, wherein:

the groups identify financial securities;

the set of function objects are associated with functions to return financial information related to specified financial securities; and the output generated by the client comprises a graphical representation of the results of the user-selected particular function as applied to the user-selected specific group.

10. A method for provided distributed functionality to a plurality of clients comprising:

providing a first server having function information defining at least one function object stored there, each function object being associated with a function and comprising a function name element and specifying at least one parameter;

in response to receipt at the first server of a first type request from a requestor, return a set of function objects to the requestor; and in response to receipt at the first server of a second type request from the requestor containing a function object having defined parameter values stored there, evaluating the function associated with the function object, modifying the received function object to include results of the function evaluation, and returning the modified function object to the requestor providing a second server;

issuing a first type request from the first server to a second server; and receiving at the first server at least one function object from the second server in response;

wherein the set of function objects returned by the first server comprising the at least one function object received from the second server and each function object further comprises a function ID and an identity of a respective provider server and at least one parameter specified in a function object is a group element in which group data indicating a set of at least one atom can be specified, the method further comprising the step of in response to a receipt of a third type request at the first server from the requestor, return group definition information to the requestor.

11. The method of 10, further comprising the steps of:

providing a second server;

issuing a third type request type from the first server to the second server; and receiving group definition information from the second server in response;

the group definition information returned to the requestor comprising the group definition information received from the second server.

12. A method for providing distributed functionality to a plurality of clients comprising:

providing at least one provider server;

providing a manager server connected to the provider servers;

in response to receipt at a particular provider server of a first type request, returning a set of function objects, each function object associated with a function and comprising a function name element and specifying at least one parameter;

in response to receipt at the particular provider server of a second type request, the second type request containing a function object having defined parameter values stored therein, evaluating the function associated with the function object, modifying the received function object to include results of the function evaluation, and returning the modified function object;

issuing a first type request from the manager server to the provider servers;

storing function objects returned to the manager server in response to the first type request;

upon receipt at the manager server of a first type request from a requestor, returning the function objects stored in the data store to the requestor; and upon receipt at the manager server of a second type request from the requester containing a particular function object, determining a particular provider server associated with the particular function object, issuing a second type request containing the particular function object to the particular provider server, receiving a modified particular function object from the particular provider sewer, and returning the modified particular function object to the requestor.

13. The method of claim 12, wherein at least one parameter specified in a function object is a group clement in which group data indicating a set of at least one atom can be specified.

14. The method of claim 13, further comprising the steps of:

in response a receipt at the particular provider server of a third type request, return group definition information;

issuing a third type request from the manager server to the provider servers;

consolidating group definition information received in response to the issued third type request;

upon receipt at the manager server of a third type request from the requestor, returning the consolidated group definition information to the requester.

15. A method of providing distributed data analysis comprising the steps of:

providing a server connected to a network;

providing a client connected to the network;

in response to receipt at the server of a first type request from the client, returning to the client a set of function objects, each function object being associated with a respective function and comprising a function name element and at least one parameter element; and in response to receipt at the server of a second type request from the client containing a function object having defined parameter values stored there, returning a modified version of the received function object including results of evaluating the function associated with the function object upon the defined parameter values;

issuing a first type request from the client to the server and receiving at the client the set of function objects in return;

updating a function object associated with a particular function to contain particular parameter values;

issue a second type request from the client to the server containing the updated function object receive a modified version of the updated function object at the client from the server;

extracting the results from the modified particular function object; and generating an output at the client related to the extracted results;

displaying at the client a list of functions associated with the received set of function objects; and receiving from a user of the client a selection from of the particular function.

16. The method of claim 15, further comprising the steps of:

displaying at the client a list of defined groups; and receiving a selection of a specific group from the user, the particular parameter values comprising the user-selected group.

17. The method of claim 16, further comprising the steps of:

in response to a receipt at the server of a third type request, return group definition information; and issuing a third type request from the client to the server; and receiving group definition information at the client from the server, wherein the list of defined groups displayed to the user is related to the received group definition information.

18. The method of claim 17, wherein:

the groups identify financial securities;

the set of function objects are associated with function to return financial information related to specified financial securities; and the output generated by the client comprises a graphical representation of the results of the user-selected particular function as applied to the user-selected specific group.

19. A computer implemented system for graphically displaying information related to financial securities comprising:

a client computer connected to a network and having a computer program stored therein to configure the computer to:

receive an indication of available financial data functions from a server connected to the network;

receive group information indicating groups of financial securities from the server;

display the available financial data function and groups to a user;

receive a selection of at least one function and at least one group from the user;

request an evaluation of the selected function having the selected group as a parameter from the serve;

receive results of the evaluation from the server; and output a graphical indication of the results of the evaluation to the user, wherein the computer program configured the client computer to request an evaluation by modifying the function objected associated with the selected function to indicate the contents of the selected group and returning the modified function object to the server.

20. The system of claim 19, wherein the indication of available financial data function comprises a set of function objects, each function object associated with a particular function and comprising a function name element and specifying at least one parameter.

21. A method for graphically displaying information related to financial securities comprising the steps of, providing a client computer connected to a network;

receiving at the client an indication of available financial data functions from a server connected to the network;

receiving group information at the client indicating groups of financial securities from the server;

displaying the available financial data function and groups to a user;

receiving a selection of at least one function and at least one group from the user;

requesting an evaluation of the selected function having the selected group as a parameter from the server;

receiving at the client results of the evaluation from the server; and outputting a graphical indication of the results of the evaluation to the user, wherein the step of requesting an evaluation comprises modifying the function object associated with the selected function to indicate the contents of the selected group and returning the modified function object to the server.

22. The method of claim 21, wherein the indication of available financial data function comprises a set of function objects, each function object associated with a particular function and comprising a function name element and specifying at least one parameter.

* * * * *